United States Patent
Cheng et al.

(10) Patent No.: US 11,834,591 B2
(45) Date of Patent: Dec. 5, 2023

(54) THERMOSETTING STARCH ADHESIVE FOR WOOD-BASED PANEL AND PREPARATION METHOD THEREFOR

(71) Applicant: Jiangnan University, Wuxi (CN)

(72) Inventors: Li Cheng, Wuxi (CN); Zhengbiao Gu, Wuxi (CN); Yong Gu, Wuxi (CN); Zhaofeng Li, Wuxi (CN); Yan Hong, Wuxi (CN); Caiming Li, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 732 days.

(21) Appl. No.: 16/850,520

(22) Filed: Apr. 16, 2020

(65) Prior Publication Data
US 2020/0239750 A1    Jul. 30, 2020

Related U.S. Application Data

(63) Continuation of application No. PCT/CN2018/119729, filed on Dec. 7, 2018.

(30) Foreign Application Priority Data

Sep. 14, 2018 (CN) .......................... 201811074093.7

(51) Int. Cl.
| | | |
|---|---|---|
| C09J 151/02 | (2006.01) | |
| B32B 7/12 | (2006.01) | |
| B32B 21/04 | (2006.01) | |
| C08F 251/00 | (2006.01) | |
| C08F 8/00 | (2006.01) | |
| C08F 2/00 | (2006.01) | |
| C08F 285/00 | (2006.01) | |
| C08F 8/12 | (2006.01) | |

(52) U.S. Cl.
CPC .............. *C09J 151/02* (2013.01); *B32B 7/12* (2013.01); *B32B 21/042* (2013.01); *C08F 251/00* (2013.01); *B32B 2405/00* (2013.01); *B32B 2451/00* (2013.01); *C08F 2/00* (2013.01); *C08F 8/00* (2013.01); *C08F 8/12* (2013.01); *C08F 285/00* (2013.01); *C09J 2403/00* (2013.01)

(58) Field of Classification Search
CPC combination set(s) only.
See application file for complete search history.

(56) References Cited

FOREIGN PATENT DOCUMENTS

| | | | |
|---|---|---|---|
| CN | 100999651 A | | 7/2007 |
| CN | 101885808 A | | 11/2010 |
| CN | 101892024 A | | 11/2010 |
| CN | 101892024 B | * | 2/2012 |
| CN | 102585736 A | | 7/2012 |
| CN | 103122228 A | | 5/2013 |
| CN | 103627352 A | | 3/2014 |
| CN | 104004478 A | * | 8/2014 |
| CN | 104004478 A | | 8/2014 |
| CN | 103627352 B | * | 7/2015 |
| CN | 107286883 A | | 10/2017 |
| JP | 2011057722 A | | 3/2011 |

OTHER PUBLICATIONS

PCT/CN2018/110729 ISA210 Mail Date Jun. 19, 2019.
PCT/CN2018/110729 ISA237 Mail Date Jun. 19, 2019.

* cited by examiner

*Primary Examiner* — Peter A Salamon
(74) *Attorney, Agent, or Firm* — IPRO, PLLC; Na Xu

(57) ABSTRACT

The present disclosure discloses a thermosetting starch adhesive for a wood-based panel and a preparation method therefor, and belongs to the technical field of preparation of adhesives. In the present disclosure, starch is used as a main raw material, and after acid hydrolysis thereof, a semi-continuous seed emulsion polymerization method is adopted to improve control of monomer polymerization stability. After grafting is completed, a cross-linking monomer with polymerizable double bonds and condensable methylol functional groups is added for copolymerization. The cross-linking monomer is also added in a semi-continuous manner. After the cross-linking reaction is completed, the reaction mixture is gelatinized and incubated, and finally a thermosetting adhesive which can be used for bonding of hot-pressed wood-based panels is obtained. The adhesive of the present disclosure has the properties of two-step cross-linking and high-temperature rapid cross-linking curing, good film formation, good heat resistance, and strong cohesion. With a hot-pressing process in an appropriate coating manner, appropriate temperature and pressure, the resultant wood-based panels have all their properties superior over those of Class II wood-based panels, and they can be widely used in decoration of hot-pressed woods, and bonding of wood-based panels and plywoods.

5 Claims, No Drawings

THERMOSETTING STARCH ADHESIVE FOR WOOD-BASED PANEL AND PREPARATION METHOD THEREFOR

TECHNICAL FIELD

The present disclosure relates to a thermosetting starch adhesive for a wood-based panel and a preparation method therefor, and belongs to the technical field of adhesive preparation.

BACKGROUND

In China, with the development of construction and decoration industries, the demand for wood products has greatly increased, but the forest area per capita is low, so wood-based panels have become an effective way to solve the shortage of wood. Most of the wood-based panels on the market are produced by hot-pressing methods using "trialdehyde" series of adhesives with high heat resistance. These methods have high production efficiency, but the raw materials of adhesives are not renewable, and the release of harmful gases such as formaldehyde has negative effects on the environment.

Starch is a kind of biological macromolecules which are extremely abundant in nature. It comes from a wide range of sources, is cheap, environmentally friendly and renewable, and has good adhesion and film forming properties. Also, the process of preparing adhesives from starch is simple. Therefore, starch-based wood adhesives constitute a major development trend today. Although production of wood-based panels by hot-pressing has greatly improved production efficiency of wood-based panels, the adhesives used for bonding are required to have good heat resistance. Moreover, the market's requirements for wood-based panels are becoming more and more strict, and the requirements on water resistance are also very high. In 2002, A. Roger (Preparation, characterization, and performance of cross-linkable maltodextrin-based lignocellulosic adhesives. Meder, A. Roger. Journal of Adhesion Science and Technology. 2002, 16 (3), 317-329) made a paper adhesive through the reaction of dextrin and NMA. The water resistance standard of the adhesive used in this method is low, which is a cold-water-based standard, and the starch strength is low. In this method, a solid-state reaction is used to improve the reaction efficiency, and the manufacturing process is cumbersome and costly. It requires the participation of a series of instruments such as a fluidized bed and freeze drier. Therefore, this method is not suitable for industrial applications. In 2008 (CN101418199B), our research group studied the adhesive prepared by using starch as a raw material under a two-monomer system. However, we did not investigate the reactivity ratio of the two monomers, which tends to produce oligomers. Moreover, the common intermittent emulsion polymerization method is not stable, the cost is high, and there is no hot pressing process.

At present, the starch-based adhesives produced by existing processes have achieved satisfactory effects in terms of storage stability and dry strength. However, most of the starch-based adhesives are thermoplastic adhesives and have not been explored in terms of hot pressing. They are linear polymers in nature, can easily cause excessive expansion during the dehydration process of hot pressing, and the adhesive layer decomposes inside. As a result, the adhesive layer exhibits poor water resistance, dry strength, and heat resistance, which limits the use of starch adhesives in the field of hot-pressing adhesives.

SUMMARY

In order to enable the starch adhesive to be applied in the field of hot pressing, the present disclosure further improves the means for modifying the starch adhesive, and provides a method for preparing a thermosetting starch adhesive applied to hot-pressed wood-based panels, and the water resistance of the resultant adhesive conforms to the requirements for new adhesives for Class II wood-based panels.

In the present disclosure n, starch as a raw material is decomposed with lactic acid to an appropriate degree, to reduce the viscosity during the reaction of the adhesive, improve the uniformity of the reaction, and reduce the molecular size of the emulsion particles so as to prevent the formation of too large emulsion particles during the cross-linking process, which may destabilize the emulsion to gelatinize. In order to further control the stability of the reaction, the grafting reaction is performed by a semi-continuous seed emulsion polymerization process which provides polymer emulsions with different properties according to the order in which functional monomers are added dropwise and the manner of addition, to reduce the viscosity during the reaction, prevent explosive polymerization and gelatinization, and improve reaction uniformity. The cross-linking monomer used is a monomer with a polymerizable double bond and a condensable methylol group. Thus, the resultant adhesive has the properties of two-step cross-linking and high-temperature rapid cross-linking curing, and its cross-linking ability is much higher than common external cross-linking agents. Depending on the reactivity ratio of different monomers, in order to increase the copolymerization rate of the cross-linking monomer, decrease the cross-linking monomer capable of linear polymerization and increase the cross-linking monomer capable of three-dimension polymerization, after the grafting reaction is completed, the cross-linking monomer is added, and by controlling the addition rate of the initiator and the cross-linking monomer, the system to be cross-linked is starved, so as to increase the copolymerization rate of the monomers and decrease their homo-polymerization rate. In addition, according to the characteristics of cross-linking modification in this reaction system, diluent urea is added after the polymerization inhibitor is added, or urea is not added to decrease urea and the oligomers formed from the cross-linking monomer through the reaction of amide groups and methylol groups, thereby preventing the degree of crosslinking from decreasing. Through the above process, the present disclosure can prepare a thermosetting starch adhesive with excellent performance by using a grafting monomer and a cross-linking monomer. With a specific temperature and pressure, hot-press curing can provide products conforming to the national standard, which further reduces the cost of the adhesive. The above hot-pressing process requires the adhesive to be evenly coated on a thin plate which is then left at room temperature for 5-15 min. Hot pressing is performed after the adhesive liquid loses its fluidity and slightly solidifies to form cross-linking bonds, so as to prevent the adhesive from penetrating into wood-based panels or overflowing in the hot-pressing process and prevent discontinuous adhesive layer as a result of too fast heating. For the hot pressing, the pressure is 0.3-0.6 MPa, and the temperature is controlled at 90-110° C. Under this hot-pressing condition, moisture will not be lost rapidly, which is conducive to the curing and dehydration reaction.

The temperature is not too high to cause expansion and decomposition of adhesive particles in the state of the emulsion. The step of pre-pressing is omitted, which improves the production efficiency. The starch adhesive prepared as above has significantly improved thermal stability and water resistance, and all properties thereof conform to the various indexes of class II wood-based panels.

The first object of the present disclosure is to provide a thermosetting starch adhesive for a wood-based panel and a preparation method therefor. The list of the basic formula of the adhesive for wood-based panels is as follows: (in parts by mass)

| | |
|---|---|
| starch | 100 parts |
| water | 300-500 parts |
| concentrated hydrochloric acid | 6-18 parts |
| sodium hydroxide | 10-20 parts |
| initiator | 1-2 parts |
| grafting monomer | 60-80 parts |
| crosslinking monomer | 2-9 parts |
| emulsifier | 1-3 parts |
| diluent | 0-10 parts |
| antifoaming agent | 10-25 parts |
| polymerization inhibitor | 0.01-0.04 part |

In an embodiment of the present disclosure, the starch is any one or a combination of corn starch, waxy corn starch, cassava starch, wheat starch, potato starch, and cross-linked starch.

In an embodiment of the present disclosure, the acid in the acid hydrolysis treatment is concentrated hydrochloric acid for laboratory use (concentration, 36-38%) or industrial hydrochloric acid (concentration, 30-32%).

In an embodiment of the present disclosure, the sodium hydroxide is a solution having a concentration of 10 mol/L.

In an embodiment of the present disclosure, the initiator is a persulfate.

In an embodiment of the present disclosure, the grafting monomer is one or more of vinyl acetate, acrylic acid, and propylene.

In an embodiment of the present disclosure, the emulsifier is any one or more of sodium lauryl sulfate, sodium dodecylsulfonate, cetyltrimethylammonium bromide, octylphenol polyoxyethylene ether-10 (OP-10), and phosphate emulsifiers.

In an embodiment of the disclosure, the diluent is urea.

In an embodiment of the present disclosure, the cross-linking monomer is one or more of N-hydroxyacrylamide derivatives having functional groups capable of copolymerization and condensation, such as N-methylol acrylamide, N-methoxymethacrylamide, N-isopropoxymethacrylamide, and N-butoxymethacrylamide.

In an embodiment of the present disclosure, the defoaming agent is a high-performance silicone defoaming agent.

In an embodiment of the present disclosure, the polymerization inhibitor is hydroquinone.

In an embodiment of the present disclosure, the starch adhesive is prepared by a method involving grafting reaction using a semi-continuous seed emulsion, and the method comprises: a part of the grafting monomer, emulsifier, and initiator are well stirred to be used as a seed emulsion; a starch emulsion made of starch as the main raw material is subjected to acid hydrolysis, its pH is adjusted, and then the seed emulsion is added; after the occurrence of graft reaction is determined, the remaining initiator is added and the remaining grafting monomer is gradually added dropwise; after the dropwise addition of the monomer is completed, the reaction mixture is incubated for a period of time, and then the initiator and the cross-linking monomer are added by the semi-continuous method to react; after the reaction is completed, the reaction mixture is heated, and incubated for a period of time; next, the residual monomer is removed; and finally, the mixture is cooled down, the polymerization inhibitor and urea are added, and the resulting mixture is discharged after well mixing, thereby obtaining a starch adhesive.

In an embodiment of the present disclosure, the preparation method is as follows:
(1) Starch and water are formulated into a starch emulsion having a concentration of 25-45% (w/w) based on dry starch, and well stirred;
(2) The temperature is 50-60° C., concentrated hydrochloric acid is added for acid hydrolysis for 1.5-2.5 h, and then the pH is adjusted to 4-5;
(3) 10-20% of initiator, 6-12% of grafting monomer relative to their respective total addition amount, and emulsifier are taken to formulate a seed emulsion. After the reaction starts, 24-48% of the initiator relative to its total addition amount is added and the remaining monomer is added slowly dropwise over 3-5 h, and 15% of the initiator relative to its total addition amount is additionally added to further react for 1.5-2 h; after the grafting is completed, 20-40% of the initiator relative to its total addition amount and a cross-linking monomer solution at a mass concentration of 5-15% are slowly added dropwise by the semi-continuous method to react for 2-6 h;
(4) the emulsion modified by grafting and cross-linking is heated to 80-85° C. and incubated for 0.5-1 h, the residual monomer is removed, the emulsion is cooled to 30-50° C., and polymerization inhibitor and urea are added, thereby obtaining a starch adhesive.

The second object of the present disclosure is to apply the prepared thermosetting starch adhesive for a wood-based panel to bonding of hot-pressed wood-based panels, and also to decoration of wood, and hot-press bonding of wood-based panels, plywoods, and wooden blocks.

In an embodiment of the present disclosure, a bonding method of the hot-pressed wood-based panel comprises coating the adhesive evenly on a thin panel, and place the thin panel under a normal temperature for 5-15 min, with a hot pressing pressure of 0.3-0.6 MPa and the temperature controlled at 90-110° C.

The reaction mechanism of the present disclosure is to form a linear polymer from the grafting monomers added. In order to avoid the problem of decreased reaction efficiency due to reactivity ratio, the cross-linking monomer is added after the grafting to further make the linear polymer form macromolecular polymers. Because the cross-linking monomer has not only double bonds but also an active group of methylol, with methylol brought into the polymer side chain, the polymer can be further cross-linked and cured only by heating to form a three-dimensional polymer. As such, the water resistance and bonding strength of the starch adhesive are greatly improved. The cross-linking monomer is a water-soluble monomer, so the initiator and cross-linking monomer should not be added too fast or too much, otherwise it is easy to cause explosive polymerization and homopolymerization. Therefore, both the monomer and the initiator are added in a semi-continuous manner. The use of semi-continuous seed emulsion polymerization in the grafting process is to improve the uniformity of the reaction and reduce the reaction viscosity to prevent the emulsion from destabilizing and gelatinization during the crosslinking process. A cross-linking curing reaction may also occur during the hot pressing process. The adhesive layer is initially cured to prevent, when the pressure increases, the adhesive layer from overflowing or penetrating into the wood panel, which results in discontinuous formation of the adhesive layer. The hot-pressing temperature is controlled at 90-110° C. At this temperature, not only can the crosslinking curing reaction be accelerated, but also the excessive expansion of the adhesive layer caused by too high temperature and the further incomplete crosslinking caused by the rapid loss of water can be prevented.

The beneficial effects of the present disclosure:

The present disclosure solves the problem that the starch adhesive cannot be used for class II plywood, imparts thermosetting properties to the starch adhesive, significantly improves the thermal stability and water resistance. The wet strength of the wood-based panels manufactured using the starch adhesive of the present disclosure exceeds that of type II wood-based panels as per GBT 9846-2015, which widens the application field of starch adhesives. The method for preparing the starch adhesive of the present disclosure has simple operation, low cost, is environmentally friendly and suitable for industrial production.

DETAILED DESCRIPTION

The present disclosure is further described below in combination with examples. It should be understood that these examples are only for the purpose of illustration, and do not limit the protection scope of the present disclosure.

Example 1

Formula (Mass Percentage):

| | |
|---|---|
| Corn starch | 100 |
| Water | 400 |
| Vinyl acetate (monomer) | 70 |
| Ammonium persulfate (initiator) | 2 |
| Sodium lauryl sulfate (emulsifier) | 6 |
| N-hydroxymethacrylamide (crosslinking monomer) | 2 |
| High-performance silicone defoaming agent | 15 |
| Hydroquinone (polymerization inhibitor) | 0.02 |

Process Flow:

(1) Corn starch was used as a raw material to formulate an emulsion with a mass concentration of 35%, which was acidified with hydrochloric acid at 60° C. for 2 h, and then adjusted to pH of about 3-5 with sodium hydroxide, heated up to 90° C., incubated for 0.5 h, and then cooled down to 70° C.

(2) The pre-formulated seed emulsion was slowly added dropwise to the reactor, the speed of the stirrer was about 300 r/min, the condensation tube was observed until the reflux liquid was significantly reduced.

(3) The initiator of 50% of its total addition amount was added to the reactor, the remaining monomer solution was slowly added dropwise for 3 h, the initiator of 15% of its total amount was additionally added, and the reaction mixture was allowed to further react for 1.5 h;

(4) The pre-formulated N-hydroxymethacrylamide solution of 10% mass concentration and the initiator of 35% of its total addition amount were slowly added dropwise in 2 hours, and the reaction mixture reacted for 4 h.

(5) After the dropwise addition of the monomer was completed, the temperature was raised to 80° C. and the reaction mixture was maintained at this temperature for 0.5 h to volatilize the residual monomers. The temperature was reduced to 50° C. and the hydroquinone polymerization inhibitor was added.

The resultant product is milky white, shiny, with low initial viscosity; with hot pressing at 100° C. and 0.4 MPa, the three-layer plywood produced has a dry strength of 1.5 MPa and a wet strength of 0.8 MPa, exceeding the national standard of 0.7 MPa.

Example 2

Formula (Mass Percentage):

| | |
|---|---|
| Corn starch | 100 |
| Water | 400 |
| Vinyl acetate (monomer) | 70 |
| Ammonium persulfate (initiator) | 2 |
| Sodium lauryl sulfate (emulsifier) | 2 |
| N-hydroxymethacrylamide (crosslinking monomer) | 6 |
| urea(diluent) | 6 |
| High-performance silicone defoaming agent | 15 |
| Hydroquinone (polymerization inhibitor) | 0.02 |

Process Flow:

(1) Corn starch was used as a raw material to formulate an emulsion with a mass concentration of 35%, which was acidified with hydrochloric acid at 60° C. for 2 h, and then adjusted to pH of about 3-5 with sodium hydroxide, added the urea and heated up to 90° C., incubated for 0.5 h, and then cooled down to 70° C.

(2) The pre-formulated seed emulsion was slowly added dropwise to the reactor, the speed of the stirrer was about 300 r/min, the condensation tube was observed until the reflux liquid was significantly reduced.

(3) The initiator of 50% of its total addition amount was added to the reactor, the remaining monomer solution was slowly added dropwise for 3 h, the initiator of 15% of its total amount was additionally added, and the reaction mixture was allowed to further react for 1.5 h;

(4) The pre-formulated N-hydroxymethacrylamide solution of 10% mass concentration and the initiator of 35% of its total addition amount were slowly added dropwise in 2 hours, and the reaction mixture reacted for 4 h.

(5) After the dropwise addition of the monomer was completed, the temperature was reduced to 50° C. and the hydroquinone polymerization inhibitor was added.

The resultant product is milky white, shiny, with low initial viscosity; with hot pressing at 100° C. and 0.4 MPa, the three-layer plywood produced has a dry strength of 1.4 MPa and a wet strength of 0 (The wet strength is measured after soaking for 3 h. If delamination occurs in 3 hours, the wet strength is 0. The relative wet strength is characterized by the delamination time. The longer the delamination time, the better the water resistance), and the delamination time is 1.5 h.

Example 3

Formula (Mass Percentage):

| | |
|---|---|
| Corn starch | 100 |
| Water | 400 |
| Vinyl acetate (monomer) | 70 |
| Ammonium persulfate (initiator) | 2 |
| Sodium lauryl sulfate (emulsifier) | 2 |
| urea(diluent) | 6 |

-continued

| High-performance silicone defoaming agent | 15 |
| Hydroquinone (polymerization inhibitor) | 0.02 |

Process Flow:

(1) Corn starch was used as a raw material to formulate an emulsion with a mass concentration of 35%, which was acidified with hydrochloric acid at 60° C. for 2 h, and then adjusted to pH of about 3-5 with sodium hydroxide, added the urea and heated up to 90° C., incubated for 0.5 h, and then cooled down to 70° C.

(2) The pre-formulated seed emulsion was slowly added dropwise to the reactor, the speed of the stirrer was about 300 r/min, the condensation tube was observed until the reflux liquid was significantly reduced.

(3) The initiator of 50% of its total addition amount was added to the reactor, the remaining monomer solution was slowly added dropwise for 3 h, the initiator of 15% of its total amount was additionally added, and the reaction mixture was allowed to further react for 1.5 h;

(4) After the dropwise addition of the monomer was completed, the temperature was raised to 80° C. and the reaction mixture was maintained at this temperature for 0.5 h to volatilize the residual monomers. The temperature was reduced to 50° C. and the hydroquinone polymerization inhibitor was added.

The resultant product is milky white, shiny; with hot pressing at 100° C. and 0.4 MPa, the three-layer plywood produced has a dry strength of 1.3 MPa and a wet strength of 0, and the delamination time is 0.5 h.

Example 4

Formula (Mass Percentage):

| Corn starch | 100 |
| Water | 400 |
| Vinyl acetate (monomer) | 70 |
| Ammonium persulfate (initiator) | 2 |
| Sodium lauryl sulfate (emulsifier) | 2 |
| N-hydroxymethacrylamide (crosslinking monomer) | 6 |
| urea(diluent) | 6 |
| High-performance silicone defoaming agent | 15 |
| Hydroquinone (polymerization inhibitor) | 0.02 |

Process Flow:

(1) Corn starch was used as a raw material to formulate an emulsion with a mass concentration of 35%, which was acidified with hydrochloric acid at 60° C. for 2 h, and then adjusted to pH of about 3-5 with sodium hydroxide, heated up to 90° C., incubated for 0.5 h, and then cooled down to 70° C.

(2) The pre-formulated seed emulsion was slowly added dropwise to the reactor, the speed of the stirrer was about 300 r/min, the condensation tube was observed until the reflux liquid was significantly reduced.

(3) The initiator of 50% of its total addition amount was added to the reactor, the remaining monomer solution was slowly added dropwise for 3 h, the initiator of 15% of its total amount was additionally added, and the reaction mixture was allowed to further react for 1.5 h;

(4) The pre-formulated N-hydroxymethacrylamide solution of 10% mass concentration and the initiator of 35% of its total addition amount were slowly added dropwise in 2 hours, and the reaction mixture reacted for 4 h.

(5) After the dropwise addition of the monomer was completed, the temperature was reduced to 50° C. and the hydroquinone polymerization inhibitor and the urea were added.

The resultant product is milky white, shiny; with hot pressing at 100° C. and 0.4 MPa, the three-layer plywood produced has a dry strength of 1.5 MPa and a wet strength of 1.1 MPa.

The effect of urea and cross-linking monomer on the performance of the adhesive is demonstrated through examples. The properties of the product obtained according to the formulas in the examples are shown in Table 1:

TABLE 1

Properties of products obtained according to different formulas in the examples

| Example | 1 | 2 | 3 | 4 |
|---|---|---|---|---|
| Swelling ratio | 0.74 | 0.95 | / | 0.61 |
| Dry strength/MPa | 1.5 | 1.4 | 1.4 | 1.5 |
| Delamination time (63° C.) | Not delaminated at 3 h | Delaminated at 1.5 h | Delaminated in 1 h | Not delaminated at 3 h |
| Wet strength/MPa | 0.8 MPa | / | / | 1.1 |

"/" Means absence of swelling ratio

* When the bonding strength is about 0.8 MPa, the plywood will be severely damaged during the stretching process, that is, the actual shear strength far exceeds the measured value and exceeds the tolerance range of the panel. The swelling ratio is measured after the starch adhesive is coated and dried on a tetrafluoroethylene plate, and then immersed in excess water for 24 h at room temperature. After swelling equilibrium, the swelling ratio $Q = (We - Wd)/Wd$, where We and Wd are the mass after swelling equilibrium and the mass before soaking, respectively.

It can be known from Table 1 that Example 1 is the thermosetting starch-based wood adhesive with the highest degree of crosslinking, Example 2 takes the second place in the degree of crosslinking, and Example 3 is an ordinary starch adhesive without the degree of crosslinking. The swelling ratio is used to characterize the crosslinking density. The swelling ratio is inversely proportional to the degree of crosslinking, so the swelling ratio of the ordinary starch adhesive without a crosslinking network in Example 3 is meaningless, that is, there is no degree of crosslinking. By comparing the above properties, it can be found that the water resistance is positively related to the degree of crosslinking. To a certain extent, the stronger the degree of crosslinking, the longer the delamination time. It can be found that urea reduces the degree of crosslinking. This is because urea added before polymerization forms oligomers with NMA, inhibiting the main reaction of NMA with starch and VAC.

Example 5

This example shows the performance comparison between adhesives prepared by some traditional processes and the starch adhesives for a wood-based panel prepared by the improved process of the present disclosure.

Method 1

Formula (Mass/g):

| Cassava starch | 100 |
| Vinyl acetate (monomer) | 80 |
| Ammonium persulfate (initiator) | 2 |
| Sodium lauryl sulfate (emulsifier) | 2 |

| | |
|---|---|
| N-hydroxymethacrylamide (crosslinking monomer) | 8 |
| High-performance silicone defoaming agent | 15 |
| Hydroquinone (polymerization inhibitor) | 0.02 |

Process Flow:

(1) Cassava starch was used as a raw material to formulate an emulsion with a mass concentration of 35%, which was acidified with hydrochloric acid at 60° C. for 2 h, and then adjusted to pH of about 3-5 with sodium hydroxide, heated up to 90° C., incubated for 0.5 h, and then cooled down to 70° C.

(2) The pre-formulated seed emulsion was slowly added dropwise to the reactor, the speed of the stirrer was about 300 r/min, the condensation tube was observed until the reflux liquid was significantly reduced.

(3) The initiator of 50% of its total addition amount was added to the reactor, the remaining monomer solution was slowly added dropwise for 3 h, the initiator of 15% of its total amount was additionally added, and the reaction mixture was allowed to further react for 1.5 h;

(4) The pre-formulated N-hydroxymethacrylamide solution of 10% mass concentration and the initiator of 35% of its total addition amount were slowly added dropwise in 2 hours, and the reaction mixture reacted for 4 h.

(5) After the dropwise addition of the monomer was completed, the temperature was raised to 80° C. and the reaction mixture was maintained at this temperature for 0.5 h to volatilize the residual monomers. The temperature was reduced to 50° C. and the hydroquinone polymerization inhibitor was added.

The resultant product is milky white, shiny, with good fluidity; with hot pressing at 105° C. and 0.3 MPa, the three-layer plywood produced has a dry strength of 1.6 MPa and a wet strength of 0.85 MPa.

Method 2

Formula (Mass/g):

| | |
|---|---|
| Cassava starch | 100 |
| Vinyl acetate (monomer) | 80 |
| Ammonium persulfate (initiator) | 2 |
| Sodium lauryl sulfate (emulsifier) | 2 |
| N-hydroxymethacrylamide (crosslinking monomer) | 2 |
| High-performance silicone defoaming agent | 15 |
| Hydroquinone (polymerization inhibitor) | 0.02 |

Process Flow:

(1) Cassava starch was used as a raw material to formulate an emulsion with a mass concentration of 35%, which was acidified with hydrochloric acid at 60° C. for 2 h, and then adjusted to pH of about 3-5 with sodium hydroxide, heated up to 90° C., incubated for 0.5 h, and then cooled down to 70° C.

(2) The pre-formulated seed emulsion was slowly added dropwise to the reactor, the speed of the stirrer was about 300 r/min, the condensation tube was observed until the reflux liquid was significantly reduced.

(3) The initiator of 50% of its total addition amount was added to the reactor, the remaining monomer solution was slowly added dropwise for 3 h, the initiator of 15% of its total amount was additionally added, and the reaction mixture was allowed to further react for 1.5 h;

(4) The pre-formulated N-hydroxymethacrylamide solution of 10% mass concentration and the initiator of 35% of its total addition amount were slowly added dropwise in 2 hours, and the reaction mixture reacted for 4 h.

(5) After the dropwise addition of the monomer was completed, the temperature was raised to 80° C. and the reaction mixture was maintained at this temperature for 0.5 h to volatilize the residual monomers. The temperature was reduced to 50° C. and the hydroquinone polymerization inhibitor was added.

The resultant product is milky white, shiny, with good fluidity; with hot pressing at 105° C. and 0.3 MPa, the three-layer plywood produced has a dry strength of 1.5 MPa and a wet strength of 0.7 MPa.

Method 3

Formula (Mass/g):

| | |
|---|---|
| Waxy corn starch | 100 |
| Vinyl acetate (monomer) | 60 |
| Ammonium persulfate (initiator) | 1.5 |
| Sodium lauryl sulfate (emulsifier) | 2 |
| N-hydroxymethacrylamide (crosslinking monomer) | 4 |
| High-performance silicone defoaming agent | 15 |
| Hydroquinone (polymerization inhibitor) | 0.02 |

Process Flow:

(1) Waxy corn starch was used as a raw material to formulate an emulsion with a mass concentration of 35%, which was acidified with hydrochloric acid at 60° C. for 2 h, and then adjusted to pH of about 3-5 with sodium hydroxide, heated up to 90° C., incubated for 0.5 h, and then cooled down to 70° C.

(2) The pre-formulated seed emulsion was slowly added dropwise to the reactor, the speed of the stirrer was about 300 r/min, the condensation tube was observed until the reflux liquid was significantly reduced.

(3) The initiator of 50% of its total addition amount was added to the reactor, the remaining monomer solution was slowly added dropwise for 3 h, the initiator of 15% of its total amount was additionally added, and the reaction mixture was allowed to further react for 1.5 h;

(4) The pre-formulated N-hydroxymethacrylamide solution of 10% mass concentration and the initiator of 35% of its total addition amount were slowly added dropwise in 2 hours, and the reaction mixture reacted for 4 h.

(5) After the dropwise addition of the monomer was completed, the temperature was raised to 80° C. and the reaction mixture was maintained at this temperature for 0.5 h to volatilize the residual monomers. The temperature was reduced to 50° C. and the hydroquinone polymerization inhibitor was added.

The resultant product is milky white, shiny, with good fluidity; with hot pressing at 105° C. and 0.3 MPa, the dry strength is 1.7 MPa, the wet strength is 1.2 MPa.

Method 4

Formula (Mass/g):

| | |
|---|---|
| Corn starch | 100 |
| Vinyl acetate (monomer) | 60 |
| Ammonium persulfate (initiator) | 1.5 |
| Sodium lauryl sulfate (emulsifier) | 2 |
| Borax (cross-linking agents) | 4 |
| High-performance silicone defoaming agent | 15 |
| Hydroquinone (polymerization inhibitor) | 0.02 |

Process Flow:

(1) Corn starch was used as a raw material to formulate an emulsion with a mass concentration of 35%, which was acidified with hydrochloric acid at 60° C. for 2 h, and then adjusted to pH of about 3-5 with sodium hydroxide, heated up to 90° C., incubated for 0.5 h, and then cooled down to 70° C.

(2) The pre-formulated seed emulsion was slowly added dropwise to the reactor, the speed of the stirrer was about 300 r/min, the condensation tube was observed until the reflux liquid was significantly reduced.

(3) The initiator of 50% of its total addition amount was added to the reactor, the remaining monomer solution was slowly added dropwise for 3 h, the initiator of 15% of its total amount was additionally added, and the reaction mixture was allowed to further react for 1.5 h;

(4) After the dropwise addition of the monomer was completed, the temperature was raised to 80° C. and the reaction mixture was maintained at this temperature for 0.5 h to volatilize the residual monomers. The temperature was reduced to 50° C. and the hydroquinone polymerization inhibitor, the borax (5.0 wt %), the urea were added.

The resultant product is milky white, shiny, with good fluidity; with hot pressing at 105° C. and 0.3 MPa, the dry strength is 1.6 MPa, the wet strength is 0, the delamination time is 1 h.

Method 5
Formula (Mass/g):

| | |
|---|---|
| Corn starch | 100 |
| Vinyl acetate (monomer) | 70 |
| Ammonium persulfate (initiator) | 1.5 |
| Sodium lauryl sulfate (emulsifier) | 2 |
| N-hydroxymethacrylamide (crosslinking monomer) | 5 |
| High-performance silicone defoaming agent | 15 |
| Hydroquinone (polymerization inhibitor) | 0.02 |

Process Flow:

(1) Corn starch was used as a raw material to formulate an emulsion with a mass concentration of 35%, which was acidified with hydrochloric acid at 60° C. for 2 h, and then adjusted to pH of about 3-5 with sodium hydroxide, heated up to 90° C., incubated for 0.5 h, and then cooled down to 70° C.

(2) The pre-formulated seed emulsion was slowly added dropwise to the reactor, the speed of the stirrer was about 300 r/min, the condensation tube was observed until the reflux liquid was significantly reduced.

(3) The initiator of 50% of its total addition amount was added to the reactor, the remaining monomer solution was slowly added dropwise for 3 h, the initiator of 15% of its total amount was additionally added, and the reaction mixture was allowed to further react for 1.5 h;

(4) The pre-formulated N-hydroxymethacrylamide solution of 10% mass concentration and the initiator of 35% of its total addition amount were slowly added dropwise in 2 hours, and the reaction mixture reacted for 4 h.

(5) After the dropwise addition of the monomer was completed, the temperature was raised to 80° C. and the reaction mixture was maintained at this temperature for 0.5 h to volatilize the residual monomers. The temperature was reduced to 50° C. and the hydroquinone polymerization inhibitor was added.

The resultant product is milky white, with poor fluidity, gelled, so that it cannot be industrially applied.

Method 6
Formula (Mass/g):

| | |
|---|---|
| Waxy corn starch | 100 |
| Vinyl acetate (monomer) | 60 |
| Ammonium persulfate (initiator) | 1 |
| Sodium lauryl sulfate (emulsifier) | 2 |
| N-hydroxymethacrylamide (crosslinking monomer) | 2 |
| High-performance silicone defoaming agent | 15 |
| Hydroquinone (polymerization inhibitor) | 0.02 |

Process Flow:

(1) Waxy corn starch was used as a raw material to formulate an emulsion with a mass concentration of 35%, which was acidified with hydrochloric acid at 60° C. for 2 h, and then adjusted to pH of about 3-5 with sodium hydroxide, heated up to 90° C., incubated for 0.5 h, and then cooled down to 70° C.

(2) The pre-formulated seed emulsion was slowly added dropwise to the reactor, the speed of the stirrer was about 300 r/min, the condensation tube was observed until the reflux liquid was significantly reduced.

(3) The initiator of 50% of its total addition amount was added to the reactor, the remaining monomer solution was slowly added dropwise for 3 h, the initiator of 15% of its total amount was additionally added, and the reaction mixture was allowed to further react for 1.5 h;

(4) The pre-formulated N-hydroxymethacrylamide solution of 10% mass concentration and the initiator of 35% of its total addition amount were slowly added dropwise in 2 h, and the reaction mixture reacted for 4 h.

(5) After the dropwise addition of the monomer was completed, the temperature was raised to 80° C. and the reaction mixture was maintained at this temperature for 0.5 h to volatilize the residual monomers. The temperature was reduced to 50° C. and the hydroquinone polymerization inhibitor was added.

The resultant product is milky white, with poor fluidity, and a small part of it gelatinizes; with hot pressing at 105° C. and 0.3 MPa, the dry strength is 1.6 MPa, and the wet strength is 0.9 MPa.

Method 7
Formula (Mass Percentage):

| | |
|---|---|
| Corn starch | 100 |
| Vinyl acetate (monomer) | 80 |
| Ammonium persulfate (initiator) | 2 |
| Sodium lauryl sulfate (emulsifier) | 2 |
| N-hydroxymethacrylamide (crosslinking monomer) | 8 |
| urea(diluent) | 10 |
| High-performance silicone defoaming agent | 15 |
| Hydroquinone (polymerization inhibitor) | 0.02 |

Process Flow:

(1) Corn starch was used as a raw material to formulate an emulsion with a mass concentration of 35%, which was acidified with hydrochloric acid at 60° C. for 2 h, and then adjusted to pH of about 3-5 with sodium hydroxide, heated up to 90° C., incubated for 0.5 h, and then cooled down to 70° C.

(2) The pre-formulated seed emulsion was slowly added dropwise to the reactor, the speed of the stirrer was about 300 r/min, the condensation tube was observed until the reflux liquid was significantly reduced.

(3) The initiator of 50% of its total addition amount was added to the reactor, the remaining monomer solution was slowly added dropwise for 3 h, the initiator of 15% of its total amount was additionally added, and the reaction mixture was allowed to further react for 1.5 h;

(4) The pre-formulated N-hydroxymethacrylamide solution of 10% mass concentration and the initiator of 35% of its total addition amount were slowly added dropwise in 2 h, and the reaction mixture reacted for 4 h.

(5) After the monomers are added dropwise, the reaction mixture was heated to 80° C. and held for 0.5 h to volatilize the residual monomers. The mixture was cooled down to 50° C. and urea and hydroquinone polymerization inhibitor were added.

The resultant product is milky white, shiny, with good fluidity; with hot pressing at 105° C. and 0.3 MPa, the three-layer plywood produced has a dry strength of 1.4 MPa and a wet strength of 0.85 MPa.

The properties comparison of the adhesives prepared by the above seven methods is shown in Table 2:

TABLE 2

Properties of adhesives prepared by different methods

| Method | 1 | 2 | 3 | 4 | 5 | 6 | 7 |
|---|---|---|---|---|---|---|---|
| Initial viscosity/Pa · s | 30.13 | 26.15 | 41.56 | 22.24 | / | / | 29.89 |
| Dry strength/MPa | 1.6 | 1.5 | 1.7 | 1.6 | — | 1.6 | 1.4 |
| Wet strength/MPa | 0.85 | 0.7 | 1.2 | 0 | — | 0.9 | 0.85 |

"/" Indicates that the viscosity exceeds the range to form gel;
"—" indicates that the adhesive cannot be applied normally.

As can be seen from Table 2, the adhesives prepared by the traditional synthetic processes (Methods 5 and 6) has too high viscosity, which is not convenient for practical application. All indexes of the adhesives prepared by the improved synthetic processes of the present disclosure (Methods 1-3) can meet the requirements. Ordinary cross-linking agents such as borax (Method 4) have no significant improvement in wet strength. The addition of urea during the polymerization process will reduce the degree of cross-linking and reduce the wet strength, and the addition of urea after polymerization (Method 7) will not affect the wet strength and can improve storage stability.

As a comparison of this patent, some adhesives prepared by conventional methods are provided below.

Comparative Example 1

Formula (Mass/g):

| Maltodextrin (DE = 5) | 170 |
| N-hydroxymethyl acrylamide (monomer) | 50 |
| Toluene-p-sulfonic acid (catalyst) | 0.1 |
| P-methoxyphenol (stabilizer) | 0.15 |

Process Flow:

(1) Maltodextrin, N-methylol acrylamide, toluene-p-sulfonic acid, and ascorbic acid were mixed to prepare a mixed liquid with a solid content of 30% w/w. p-methoxyphenol was added as a stabilizer.

(2) The mixture was frozen within 8 h and store at −20° C.

(3) The frozen mixture was freeze-dried.

(4) The freeze-dried product was processed in a fluidized bed reactor at 150° C. to obtain a prepolymer of a methylene acrylamide ether derivative.

(5) The prepolymer was dispersed uniformly in water to make a solution with a solid content of 30% w/w.

(6) The prepolymer liquid was applied to the paper and a small amount of 30% $H_2O_2$ was sprayed thereon to form the final polymer.

The resultant product is slightly yellow and can be used for rapid curing and bonding of paper at room temperature. However, it has been found through experiments that the polymer colloid cannot be used for the preparation of hot-pressed panels, and is not convenient for the industrial production of wood-based panels.

Comparative Example 2

Formula (Mass/g):

| Vinyl acetate | 50 |
| Polyvinyl alcohol (protective colloid) | 7 |
| Alkylphenol polyoxyethylene ether (10) | 0.5 |
| Ammonium persulfate (initiator) | 0.75 |
| Sodium dodecyl sulfate | 6.25 |
| N-hydroxymethacrylamide | 0.5 |

Process Flow:

(1) 25 g of vinyl acetate, 7 g of polyvinyl alcohol, 0.5 g of alkylphenol polyoxyethylene ether, 6.25 g of sodium lauryl sulfate, 0.375 g of ammonium persulfate, 0.5 g of NMA and 250 g of water were mixed to obtain a uniform emulsion.

(2) The temperature was increased to 40° C. and the emulsion was incubated for 0.5 h.

(3) The temperature was raised to 70° C., another 0.375 g of ammonium persulfate was added, and 20 g of vinyl acetate was slowly added dropwise to the emulsion to react for 6 h.

(4) The temperature was raised to 85° C., and polymerization was further performed for 0.5 h.

The temperature was reduced to 50° C. and other additives were added.

The resultant product is milky white. The wooden block was bonded and cured at room temperature. The polymer colloid is not based on starch, and it is difficult to control the production process. Also, it cannot be used for the preparation of hot-pressed panels. In wood-based panels, the dry strength can reach 1 MPa, and the wet intensity is 0 MPa.

What is claimed is:

1. A preparation method for a thermosetting starch adhesive wherein thermosetting starch adhesive for a wood-based panel comprises, in parts by mass, 100 parts of starch, 300-500 parts of water, 6-18 parts of concentrated hydrochloric acid, 10-20 parts of sodium hydroxide, 1-2 parts of an initiator, 60-80 parts of a grafting monomer, 2-9 parts of a crosslinking monomer, 1-3 parts of an emulsifier, 0-10 parts of a diluent, 10-25 parts of an antifoaming agent, and 0.01-0.04 part of a polymerization inhibitor; and wherein the preparation method comprises: preparing a seed emulsion by stirring a part of the grafting monomer, the emulsifier, and the initiator well to be used as the seed emulsion; performing acid hydrolysis of a starch emulsion made of the starch as a main raw material, adjusting pH of the starch emulsion to pH 4-5, and then adding the seed emulsion to the starch emulsion to form a reaction mixture for starting a grafting reaction; adding a first portion of the remaining initiator and gradually adding dropwise the remaining grafting monomer to the reaction mixture, incubating the reaction mixture for 3-5 hours, and adding a second portion of the remaining initiator and the cross-linking monomer by a semi-continuous method to react for 2-6 hours; heating the reaction mixture, and incubating for 0.5-1 hour; next, removing the residual monomer; and finally, cooling down the reaction mixture, adding the polymerization inhibitor and urea, and discharging the resulting mixture after mixing well, thereby obtaining the thermosetting starch adhesive.

2. The preparation method according to claim 1, wherein the crosslinking monomer comprises one or more of N-hydroxyacrylamide derivatives of N-methylol acrylamide, N-methoxymethacrylamide, N-isopropoxymethacrylamide, and N-butoxymethacrylamide.

3. The preparation method according to claim 1, wherein the grafting monomer is one or more selected from a group consisting of vinyl acetate, acrylic acid, butyl acrylate, methyl acrylate, and acrylamide.

4. The preparation method according to claim 1, wherein the emulsifier is one or more selected from a group consisting of sodium lauryl sulfate, sodium dodecylsulfonate, cetyltrimethylammonium bromide, octylphenol polyoxyethylene ether-10 (OP-10), and phosphate emulsifiers.

5. The preparation method according to claim 1,
wherein preparing the seed emulsion comprises: taking 10-20% of the initiator and 6-12% of the grafting monomer relative to their respective total addition amount, and the emulsifier to formulate the seed emulsion;

wherein performing acid hydrolysis of the starch emulsion comprises formulating starch and water into the starch emulsion with a mass ratio of 25-45% based on dry starch, stirring well, and adjusting a temperature of the starch emulsion to 50-60° C., adding 0.5 mol/L hydrochloric acid for acid hydrolysis for 1.5-2.5 hours, and then adjusting pH of the starch emulsion to pH 4-5;

wherein adding the first portion of the remaining initiator comprises adding 24-48% of the initiator relative to its total addition amount;

wherein adding the second portion of the remaining initiator and the cross-linking monomer comprises slowly adding dropwise 20-40% of the initiator relative to its total addition amount and a cross-linking monomer solution at a mass concentration of 5-15%;

wherein heating the reaction mixture comprises heating to 80-85° C.;

and wherein cooling down the reaction mixture comprises cooling the reaction mixture to 30-50° C.

* * * * *